(12) United States Patent
Brock

(10) Patent No.: US 9,306,940 B2
(45) Date of Patent: Apr. 5, 2016

(54) MITIGATING RISK OF ACCOUNT ENUMERATION

(71) Applicant: Square, Inc., San Francisco, CA (US)

(72) Inventor: Christopher Michael Brock, Albany, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/480,222

(22) Filed: Sep. 8, 2014

(65) Prior Publication Data

US 2016/0072793 A1    Mar. 10, 2016

(51) Int. Cl.
*H04L 29/06*    (2006.01)

(52) U.S. Cl.
CPC .................. *H04L 63/083* (2013.01)

(58) Field of Classification Search
CPC ..................................................... H04L 63/083
See application file for complete search history.

(56) References Cited

U.S. PATENT DOCUMENTS

| | | | |
|---|---|---|---|
| 6,629,105 B1 * | 9/2003 | Young | G06F 17/30067 707/802 |
| 8,706,739 B1 * | 4/2014 | Song | G06F 17/30 707/748 |
| 2003/0009698 A1 * | 1/2003 | Lindeman | H04L 12/585 726/4 |
| 2005/0166263 A1 | 7/2005 | Nanopoulos et al. | |
| 2005/0262209 A1 * | 11/2005 | Yu | H04L 51/28 709/206 |
| 2007/0226297 A1 * | 9/2007 | Dayan | G06Q 10/107 709/206 |
| 2009/0022309 A1 | 1/2009 | Vanstone et al. | |
| 2009/0044013 A1 * | 2/2009 | Zhu | G06Q 10/107 713/170 |
| 2009/0300364 A1 | 12/2009 | Schneider | |
| 2010/0154063 A1 | 6/2010 | Hutton et al. | |
| 2011/0319056 A1 * | 12/2011 | Toy | H04W 12/06 455/412.2 |
| 2012/0278633 A1 | 11/2012 | Frieder et al. | |
| 2013/0144703 A1 * | 6/2013 | VanNoller | G06Q 30/0225 705/14.26 |
| 2014/0331310 A1 * | 11/2014 | Salada | G06Q 10/107 726/12 |

OTHER PUBLICATIONS

International Search Report and Written Opinion, for Application No, PCT/US2015/048832 by Christopher Michael Brock, filed Sep. 8, 2015.

* cited by examiner

*Primary Examiner* — Beemnet Dada
(74) *Attorney, Agent, or Firm* — Perkins Coie LLP

(57) ABSTRACT

Technology is disclosed for mitigating account enumeration and thus enhances network security. The technology can receive from a client computing device a sequence of characters corresponding to a portion of an email address input by a user. The technology retrieves a set of email addresses that have a common first portion identical to the received sequence of characters and generates hashed data. The hashed data is sent to the client computing device. A result value is then generated by hashing the input email address by using the same hashing function as the hashed data. If the result value is in the hashed data, the technology displays a text region for collecting from the user a password.

30 Claims, 7 Drawing Sheets

MITIGATING RISK OF ACCOUNT ENUMERATION

BACKGROUND

Online systems often require users to enter various credentials before permitting use. For example, various financial systems can request a user identifier (e.g., an electronic mail ("email") address) and a password. A user using a mobile computing device or other client computing device ("client") enters the credentials and software executing at the client generally transmits the entered credentials to a server computing device ("server") that is a part of a corresponding online system. When the user incorrectly enters the identifier or password, the server responds with a message that permission for use is denied. However, some users can become confused when permission is denied. For example, there is commonly no indication that the user mistyped the user identifier or password (e.g., to prevent guessing or "hacking"). Moreover, when the user enters the user identifier incorrectly (e.g., makes a typographical error), the user must nevertheless wait for the client to transmit the incorrectly entered identifier and password to the server and receive a response indicating that permission was denied. Also, a user interface that requests a user identifier and password is inelegant in such cases.

BRIEF DESCRIPTION OF THE DRAWINGS

Embodiments of the disclosed technology will be described and explained through the use of the accompanying drawings.

Figure 1:
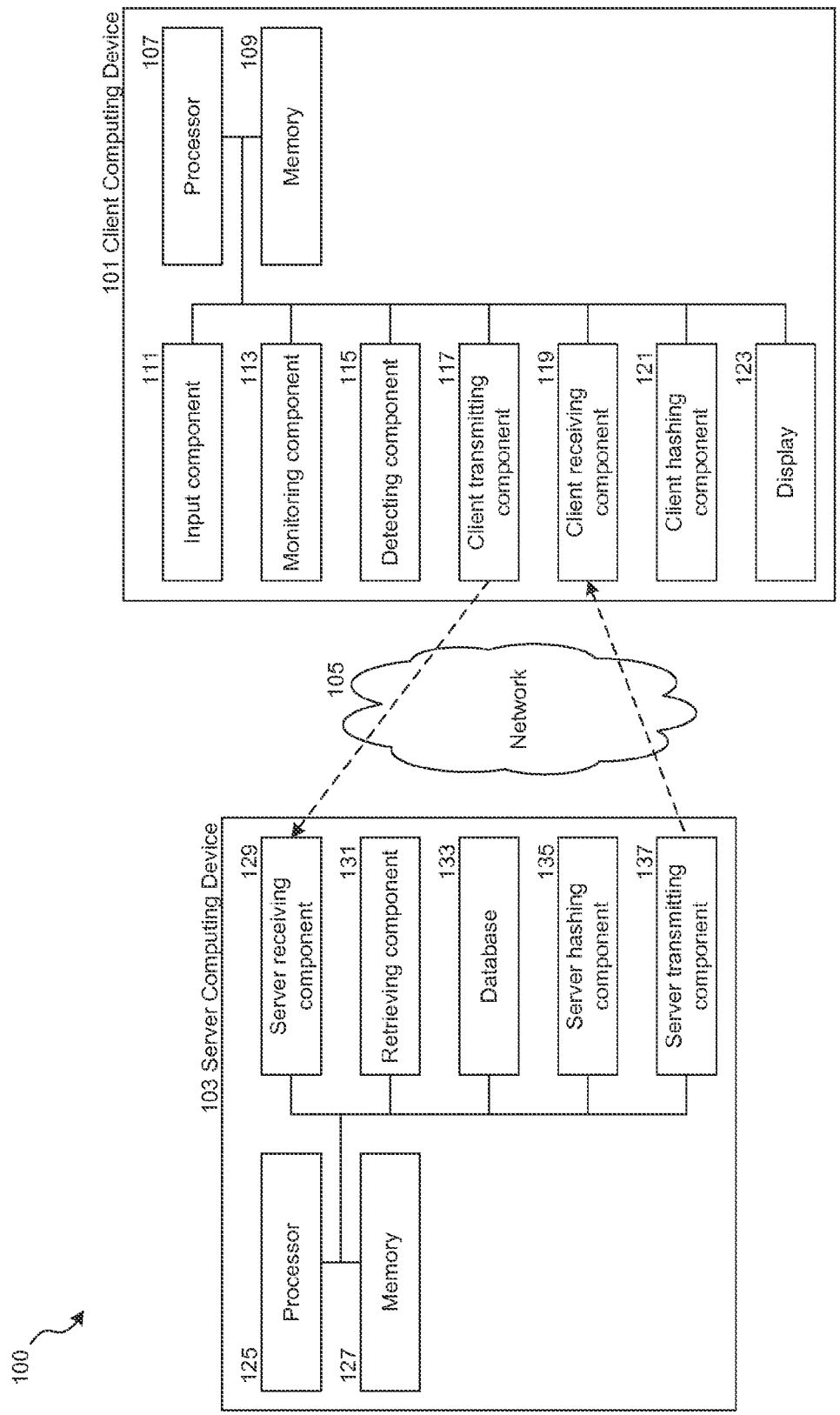
FIG. 1 is a schematic diagram illustrating a system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "an embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to also are not necessarily mutually exclusive.

Account enumeration or login attack is a type of hostile conduct that collects user identifiers, account names, privileges, or other sensitive information from a web site without proper authorization. For example, an attacker can first collect account information of a website by attempting to login to the website. By a trial-and-error approach, the attacker may collect multiple valid user identifiers. Based on these valid user identifiers, the attacker can then launch a second round of attack of password guessing and may eventually breach the security system of the website. Therefore, a system that sends out multiple user identifiers (or a whole list) to a client can inadvertently reveal account information to an attacker and thereby weaken the system. While user experience is also crucial to websites, an improved method or system for limiting or mitigating account enumeration without substantially interfering with legitimate users' interaction with the websites is desirable and advantageous.

Technology is disclosed for mitigating risk of account enumeration made possible by partial account validation at a client computing device ("the technology"). In various embodiments, the technology receives at a client computing device a set of possible user identifiers, and only upon receiving a partially complete user identifier that is in the set of possible user identifiers, displays a password region. More particularly, the technology can dynamically verify whether a user identifier (e.g., an email address) exists based on an initial portion of the user identifier input by a user. In addition, the technology can locally (e.g., at a client through a browser) verify account existence. The technology can initially provide a first text region for a user to input a user identifier. Before the user finishes inputting the user identifier, the technology can dynamically verify existence of the user identifier without incurring latencies expected by querying a server.

In various embodiments, a client computing device can collect a user identifier (e.g., an email address) input by a user. The client computing device monitors an initial sequence of characters input by the user (e.g., assuming that a user inputs "ABCDE@") and detects a specified character (e.g., an ampersat, "c"). Once the specified character is detected, the client computing device can transmit a sequence of characters (e.g., those characters entered before the specified character was detected; e.g., a string "ABCDE@") to a server computing device. The transmitted sequence of characters can be an initial portion of the user identifiers. The client computing device can continue collecting the rest of the user identifier from the user.

After receiving the sequence of characters from the client computing device, the server computing device retrieves a set of valid user identifiers that have a common first portion identical to the received sequence of characters (e.g., email addresses starting with the string "ABCDE," such as "ABCDE@hotmail.com," "ABCDE@gmail.com," or "ABCDE@uspto.gov") from a database. The server computing device can limit the number of the retrieved user identifiers, e.g., to a specified maximum number, e.g., one hundred. The server computing device then performs a hashing function to these retrieved user identifiers to produce hashed data. When the hashing is performed, a salt value (e.g., a data key used as an additional input for hashing functions) and/or generated noise data can also be hashed. The hashed data can then be transmitted back to the client computing device, along with a complexity value that is indicative of how the hashing was performed (e.g., how many times the hashing was performed).

After receiving the hashed data and the complexity value, the client computing device performs the hashing function (based on the received complexity value) to the user identifier received thus far from the user to generate a result value. The client computing device then locally compares the hashed data and the result value. If the result value is in the hashed data, which means that the collected user identifier exists in the set of valid user identifiers, then a second text region can be displayed to collect a password from the user. If the result value is not in the hashed data, which means that the collected user identifier does not exist in the set of valid user identifiers, then a third text region can be displayed to request the user to register a new account.

The disclosed technology effectively mitigates the risks caused by possible account enumeration by providing a proof-of-work (POW) system that utilizes hashing functions. Specifically, once the disclosed technology detects a suspicious conduct of account enumeration (e.g., repeatedly trying various user identifiers without successful logins), the system can increase the complexity value, for example, by increasing the specified number of times performing the hashing function. The increase of complexity requires potential attackers to spend much more computing resources for account enumeration (e.g., hashing 5,000 times can cost much more computing resources than hashing only 5 times). To further mitigate account enumeration, noise data can be generated and hashed when a suspicious conduct is identified or confirmed.

In addition, the disclosed technology also provides satisfying and impressive user experiences by completing the account verification task before the user actually finishes inputting the user identifier. Implementation of the disclosed technology neither interrupts users' interactions with websites, nor causes delayed responses to users. The disclosed technology provides a solution that can reduce the risks of account enumeration without sacrificing user satisfaction.

FIG. 1 is a schematic diagram illustrating a system 100 in accordance with embodiments of the disclosed technology. The system 100 includes a client computing device 101 and a server computing device 103. The client computing device 101 and the server computing device 103 can communicate with each other through a network 105. In some embodiments, the network 105 can be the Internet. In other embodiments, the network 105 can be an intranet or the like. The client computing device 101 includes a processor 107, a memory 109, an input component 111, a monitoring component 113, a detecting component 115, a client transmitting component 117, a client receiving component 119, a client hashing component 121, and a display 123. The processor 107 is coupled to the memory 109 and configured to control the input component 111, the monitoring component 113, the detecting component 115, the client transmitting component 117, the client receiving component 119, the client hashing component 121, and the display 123. In some embodiments, the client computing device 101 can be a personal computer, a portable/mobile device, a smartphone, a personal digital assistant (PDA) device, or other electronic devices that are capable of communicating with other devices (e.g., the server computing device 103) via networks (e.g., the network 105).

A shown in FIG. 1, the server computing device 103 can include a processor 125, a memory 127, a server receiving component 129, a retrieving component 131, a database 133, a server hashing component 135, and a server transmitting component 137. The processor 125 is coupled to the memory 127 and configured to control the server receiving component 129, the retrieving component 131, the database 133, the server hashing component 135, and the server transmitting component 137. In some embodiments, the server computing device 103 can be a server computer, a super computer, a mainframe computer, or other suitable electronic devices that are capable of providing services (e.g., website service) through the network 105.

The input component 111 can be configured to receive user inputs (e.g., user identifiers and passwords) for the client computing device 101. In some embodiments, the input component 111 can be a keyboard, a touch screen, a mouse, a pointer, or other suitable devices. The display 123 can be configured to display a user interface for the client computing device 101. For example, the user interface can include a first text region for collecting a user identifier (e.g., an email address), a second text region for collecting a password, and a third text region for requesting users to register new accounts.

The monitoring component 113 is configured to monitor a user input. In some embodiments, the monitoring component 113 monitors an initial sequence of characters (e.g., a string "ABCDE" shown in FIG. 2A) received in the first text region. The initial sequence of characters input by a user can be displayed in the first text region of the display 123. The detecting component 115 can be configured to detect a specified character that is received in the first text region. In some embodiments, the specified character can be an ampersat (i.e., at sign, "@"). In some embodiments, the specified character can be a dot. In some embodiments, the specified character can be a string that represents a name (e.g., a string "John"), organizational information (e.g., a string "USPTO"), or geographical information (e.g., a string "California").

Once the specified character is detected, the client transmitting component 117 can transmit a sequence of characters (e.g., the characters entered until the specified character was detected) to the server receiving component 129 of the server computing device 103. The server receiving component 129 is configured to receive the sequence of characters from the client transmitting component 117. Sometimes the initial sequence of characters can be input incorrectly and may need to be corrected by a user (e.g., by using a backspace key on a keyboard). In some embodiments, the client transmitting component 117 can hold for a period of time (e.g., 0.5 second) before actually transmitting the sequence to characters to the server receiving component 129, in case the user needs to correct the initial sequence of characters.

In response to receiving the sequence of characters, the retrieving component 131 retrieves from the database 133 a set of user identifiers that have a common first portion identical to the sequence of characters. In some embodiments, the set of user identifiers can be limited to a specified maximum number (e.g., 50 user identifiers). For example, the specified maximum number can be determined (e.g., based on empirical data) in order to prevent consuming excessive computing resources in related tasks.

In some embodiments, when the initially retrieved set of user identifiers exceeds the specified maximum number (e.g., there are more user identifiers having a common first portion to the sequence of characters than the specified maximum number), the set of retrieved user identifiers can be updated. In some embodiments, the set of retrieved user identifiers can be updated by receiving an updated sequence of characters from the client computing device 101. The updated sequence of characters can include one or more additional characters input by the user after the specified character is detected. For example, the updated sequence of characters (e.g., "ABCDE@gmail") can include the original sequence of characters (e.g., "ABCDE") and five additional characters (e.g., "gmail") input by a user after the specified character (e.g., "@") is detected. In other embodiments, the updated sequence of characters can include a complete user identifier (e.g., "ABCED@gmail.com") input by a user. In other words, the client transmitting component 117 does not transmit the sequence of character until a full user identifier is completely input.

The server hashing component 135 is configured to perform a hashing function to each of the retrieved user identifiers for a specified number of times, so as to generate hashed data. The hashed data includes hashed retrieved user identifiers. In some embodiments, the hashing function can be MD5, SHA-1, SHA-2, or other suitable hashing functions. A complexity value that is indicative of the specified number of times that the hashing has been performed can also be generated. For example, a complexity value "10" can mean that the hashing has been performed ten times.

In some embodiments, the hashing can be performed with a salt value (e.g., a data key used as an additional input for hashing to increase security). The hashed salt value can be part of the hashed data. The salt value can be a public salt value (known to the public) or a private salt (known only by a limited number of persons). In some embodiments, the salt value can be generated by the server hashing component 135. In some embodiments, the server hashing component 135 can generate noise data and then hash the same. The hashed noise data can be part of the hashed data.

After the hashed data is generated, the server transmitting component 137 can transmit the hashed data and the complexity value to the client receiving component 119. The client receiving component 119 can then transmit the hashed data to the client hashing component 121. Based on the hashed data and the complexity level, the client computing device 101 can determine that how hashing has been performed for the retrieved user identifiers.

When the user identifier has been completely input (e.g., through the input component 111), the client hashing component 121 can perform the same hashing function to the input user identifier under the same parameters (e.g., the number of times that the hashing function was performed; which salt value has been added; and how much noise data has been generated and hashed) as those adopted by the server hashing component 135. The hashing of the input user identifier generates a result value.

The client hashing component 121 can then determine whether the generated result value is in the received hashed data. In an event that the result value is in the received hashed data, the second text region for collecting from the user a password can be displayed by the display 123. In an event that the result value is not in the received hashed data, the third text region for requesting the user to register a new account can be displayed by the display 123.

In some embodiments, an amount of the generated and hashed noise data can correspond to the complexity value. For example, the noise amount in the hashed data with a complexity value "4" can be twice as the noise amount in the hashed data with a complexity value "2."

In some embodiments, the amount of generated and hashed noise data can correspond to an identified user conduct. Examples of the identified user conduct include trying to login with various user identifiers from a same network address, attempting to login with various user identifiers without any successful logins etc.

In some embodiments, the complexity value and the amount of the noise data can gradually increase if there is a suspicious user conduct. For example, once a suspicious user conduct is identified (e.g., manually by an administrator or automatically by predetermined criteria), the complexity value then increases for the next round hashing. A higher complexity value means performing the hashing function more times, which accordingly requires more computing resources. By doing so, the system 100 can increase the difficulty for account enumeration because an attacker needs a relatively large amount of computing resources to complete the attack. For example, an attacker may be able to acquire a very limited number of user identifiers in early rounds of attacks, but with the increase of the complexity value, it becomes extremely difficult or even impossible for the attacker to get account information from the system 100. In some embodiments, once a suspicious user conduct is confirmed (e.g., manually by an administrator or automatically by predetermined criteria), the hashed data transmitted to the client computing device 101 can only include hashed noise data without any real user identifiers. By doing so, the system 100 can make sure that no account information is revealed to a confirmed attacker.

Figure 2A:
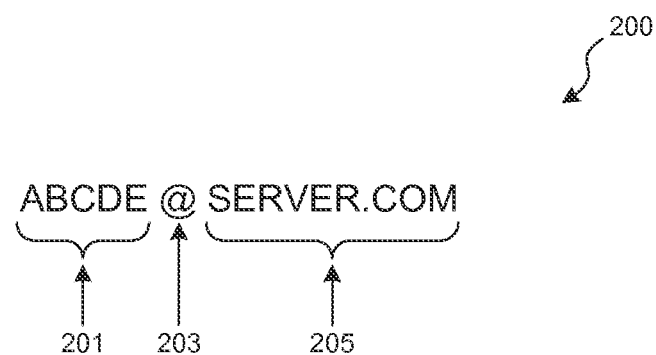
FIG. 2A is a schematic diagram illustrating portions of a user identifier in accordance with embodiments of the disclosed technology.

FIG. 2A is a schematic diagram illustrating portions of a user identifier in accordance with embodiments of the disclosed technology. As shown in FIG. 2A, the user identifier 200 can be an email address. The user identifier 200 can include an initial sequence of characters 201, a specified character 203, and an additional sequence of characters 205. In the illustrated embodiment, the initial sequence of characters 201 is a string of "ABCDE," the specified character 203 is an ampersat, and the additional sequence of characters 205 is a string of "SERVER.COM." Together these three portions constitute a full email address "ABCDE@SERVER.COM."

Figure 2B:
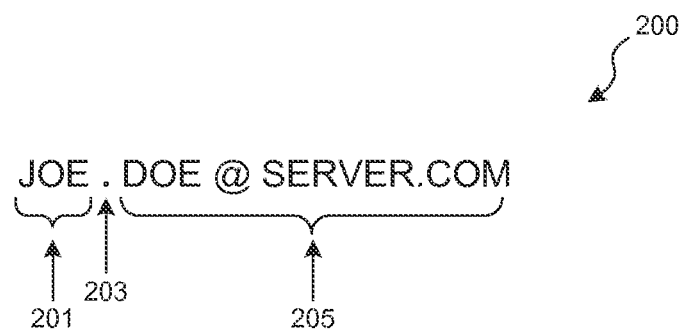
FIG. 2B is another schematic diagram illustrating portions of a user identifier in accordance with embodiments of the disclosed technology.
Figure 2C:
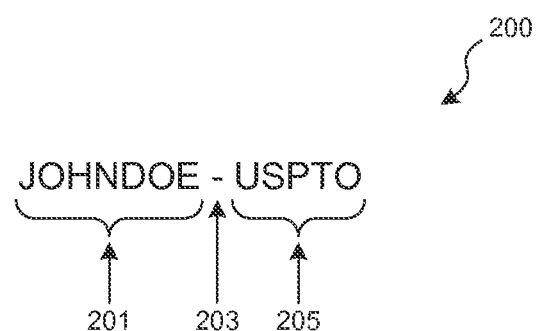
FIG. 2C is yet another schematic diagram illustrating portions of a user identifier 200 in accordance with embodiments of the disclosed technology.

FIG. 2B is another schematic diagram illustrating portions of a user identifier 200 in accordance with embodiments of the disclosed technology. As shown in FIG. 2B, the user identifier 200 can be an email address. The user identifier 200 can include an initial sequence of characters 201, a specified character 203, and an additional sequence of characters 205. In the illustrated embodiment, the initial sequence of characters 201 is a string of "JOE," the specified character 203 is a dot, and the additional sequence of characters 205 is a string of "DOE@SERVER.COM." Together these three portions constitute a full email address, "JOE.DOE@SERVER.COM."

FIG. 2O is yet another schematic diagram illustrating portions of a user identifier 200 in accordance with embodiments of the disclosed technology. As shown in FIG. 2O, the user identifier 200 can be two strings connected by a dash symbol ("-"). The user identifier 200 can include an initial sequence of characters 201, a specified character 203, and an additional sequence of characters 205. In the illustrated embodiment, the initial sequence of characters 201 is a string of "JOHNDOE," the specified character 203 is the dash symbol, and the additional sequence of characters 205 is a string of "USPTO." Together these three portions constitute a full account name "JOHNDOE-USPTO" that can indicative of which organization (e.g., "USPTO") the user identifier 200 belongs to.

Figure 2D:
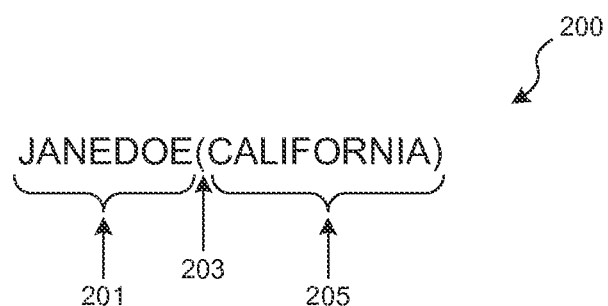
FIG. 2D is still another schematic diagram illustrating portions of a user identifier 200 in accordance with embodiments of the disclosed technology.

FIG. 2D is still another schematic diagram illustrating portions of a user identifier 200 in accordance with embodiments of the disclosed technology. As shown in FIG. 2D, the user identifier 200 can be two strings separated by a parenthesis symbol. The user identifier 200 can include an initial sequence of characters 201, a specified character 203, and an additional sequence of characters 205. In the illustrated embodiment, the initial sequence of characters 201 is a string of "JANEDOE," the specified character 203 is a left parenthesis symbol ("("), and the additional sequence of characters 205 is a string of "CALIFORNIA)." Together these three portions constitute a full account name "JANEDOE(CALIFORNIA)" that can be indicative of which geographical region (e.g., "CALIFORNIA") the user identifier 200 belongs to.

Figure 3A:
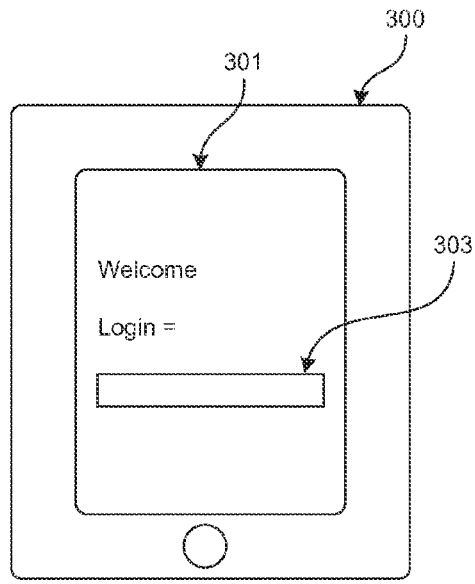
FIGS. 3A-3E are schematic diagrams illustrating a client computing device in accordance with embodiments of the disclosed technology.

FIGS. 3A-3E are schematic diagrams illustrating a client computing device 300 in accordance with embodiments of the disclosed technology. As shown in FIG. 3A, the client computing device 300 can include a display 301 for presenting a user interface to interact with a user. In the illustrated embodiment, a first text region 303 can be displayed on the display 301, allowing a user to input a user identifier or an account name.

Figure 3B:
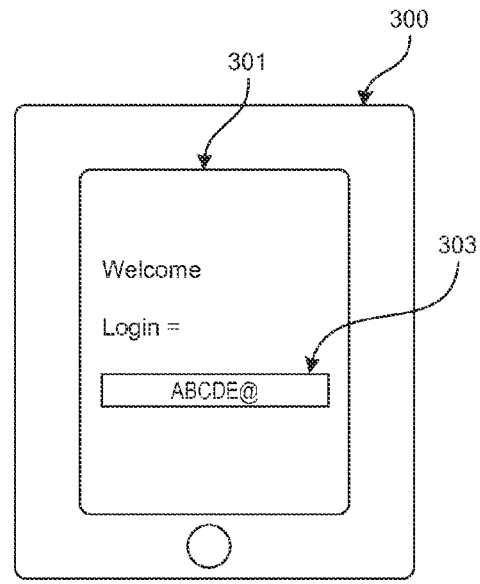

In FIG. 3B, when the user enters an initial sequence of characters "ABCDE" and a specified character "@" in the first text region 303, these characters can be shown on the display 301. Once the specified character "@" is detected (e.g., by the detecting component 115), the initial sequence of characters "ABCDE" can be transmitted to a server computing device (e.g., the server computing device 103) for a further process (e.g., to generate hashed data therefrom, as discussed in detail above). After the process is completed, the client computing device 300 receives the hashed data relating to a set of user identifiers that have a common first portion identical to the initial sequence of characters along with a complexity value from the server computing device.

Figure 3C:
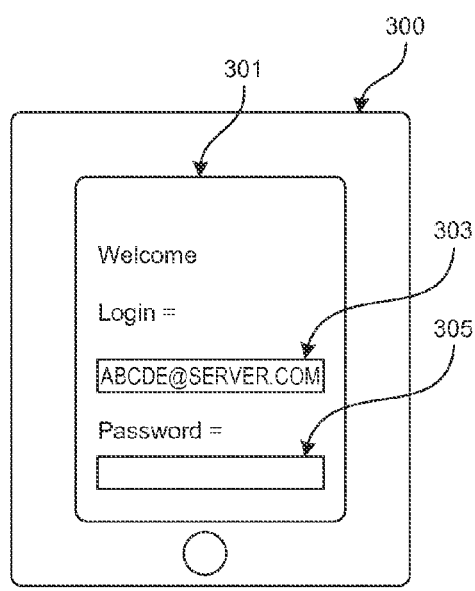
Figure 3D:
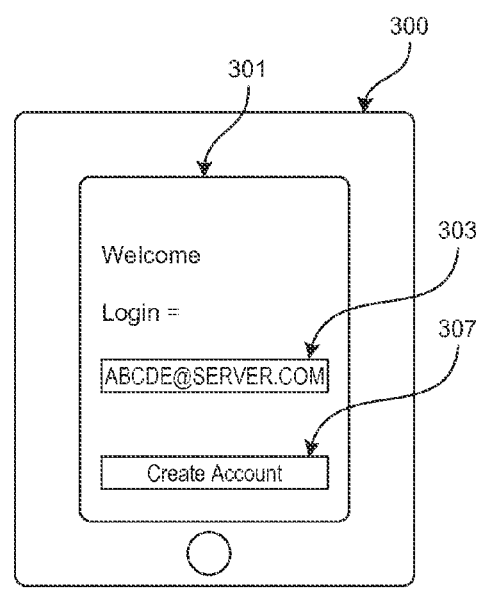

In FIG. 3C, the user continues to input an additional sequence of characters "SERVER.COM" in the first text region 303. The client computing device 300 can generate a result value by performing the same hashing function, with reference to the received complexity value, to the input user identifier as the server computing device did. As shown in FIG. 3O, in an event that the result value is in the received hashed data, a second text region 305 for collecting from the user a password can be displayed on the display 301. As shown in FIG. 3D, in an event that the result value is not in the received hashed data, a third text region 307 for requesting the user to register a new account can be displayed on the display 301.

Figure 3E:
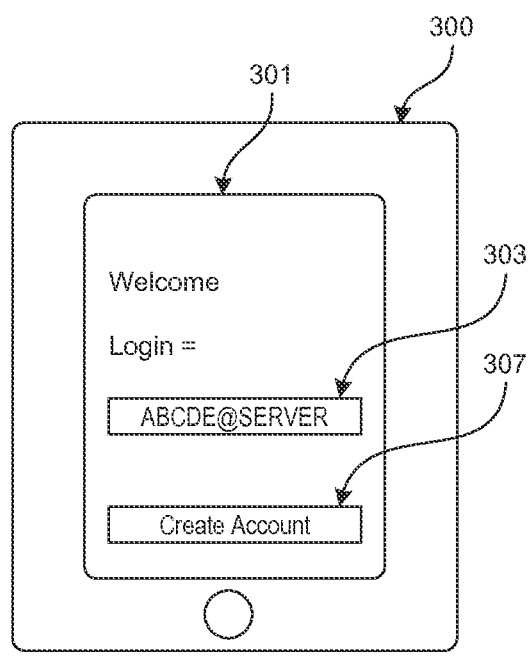

In some embodiments, the server computing device may find that there is no matched user identifier having a common first portion identical to the received sequence of characters. In such cases, the server computing device can transmit a signal to the client computing device 300, indicating that there is no match. As shown in FIG. 3E, the client computing device 300 can display the third text region 307 for requesting the user to register a new account, even before the user completes inputting a full user identifier. In other words, the client computing device 300 can quickly verify account existence even with an incomplete user input, which provides high quality and impressive user experience.

Figure 4:
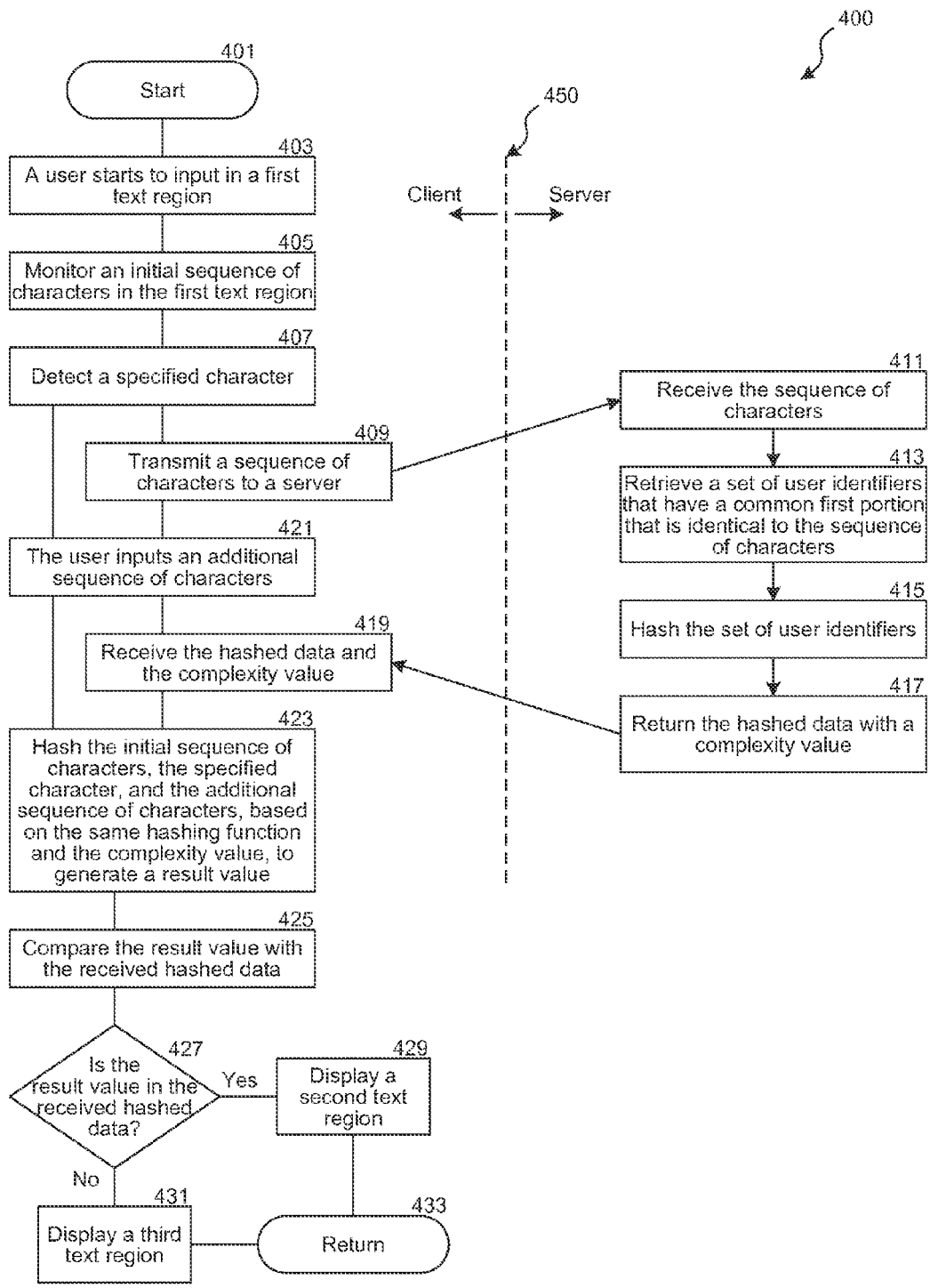
FIG. 4 is a flow chart illustrating operations of a method in accordance with embodiments of the disclosed technology.

FIG. 4 is a flow chart illustrating operations of a method 400 in accordance with embodiments of the disclosed technology. The method 400 can be implemented by a client computing device (e.g., the client computing device 101) and a server computing device (e.g., the server computing device 103). Processes implemented by the client computing device are shown on the left of dashed line 450, while those implemented by the server computing device are shown on the right.

The method 400 starts at block 401. The method 400 continues at block 403 by allowing a user to input a user identifier or an account name in a first text region. In some embodiments, the first text region can be displayed on a user interface of the client computing device. The method 400 continues at block 405 by monitoring an initial sequence of characters input by the user in the first text region. The method 400 proceeds to block 407 by detecting a specified character in the initial sequence of characters. In some embodiments, the specified character can be an ampersat, a dot, a parenthesis symbol, or a string that can represents a name, organizational information, geographical information or other characters.

Once the specified character is detected, at block 409, the method 400 transmits a sequence of character (e.g., the characters entered before the specified character was detected) to the server computing device. The method 400 continues at block 421 by allowing the user keeps inputting an additional sequence of characters.

In parallel, the method 400 proceeds to block 411. At block 411, the server computing device receives the sequence of characters from the client computing device. At block 413, the server computing device continues to retrieve from a database a set of user identifiers (e.g., email addresses) that have a common first portion identical to the sequence of characters. In some embodiments, if there is no matched user identifier having a common first portion identical to the received sequence of characters in the database, the method 400 can directly proceed (not shown) to block 431 and displays a third text region for creating a new account.

At block 415, the method 400 hashes the retrieved user identifiers for a specified number of times by a hashing function to generate hashed data. The hashed data includes the hashed retrieved user identifiers. At block 415, the method 400 also generates a complexity value that is indicative of the specified number of times that the hashing has been performed. The hashing function can be MD5, SHA-1, SHA-2, or other suitable hashing functions. In some embodiments, the hashing can be performed with a public or private salt value (e.g., a data key used as an additional input for hashing to increase security). The hashed salt value can be part of the hashed data. In some embodiments, the method 400 can also generate noise data and hashes the same. The hashed noise data can be part of the hashed data. In some embodiments, an amount of the generated and hashed noise data can correspond to the complexity value.

At block 417, the method 400 then returns the hashed data and the complexity value to the client computing device. At block 419, the client computing device receives the hashed data and the complexity value. The method 400 then continues at block 423 and hashes the full input user identifier (e.g., including the initial sequence of characters, the specified character, and the additional sequence of characters) to generate a result value. The hashing is performed by using the same hashing function and salt value as the server computing device did. Also, the hashing is performed for the same specified number of times (e.g., can be learned from the complexity value).

At block 425, the method 400 compares the result value and the hashed data. The method then proceeds to block 427 to determine if the result value is in the hashed data. If the determination is affirmative, the method 400 proceeds to block 429 and displays a second text region for collecting a password from the user. If the determination is negative, then the method 400 proceeds to block 431 and display a third text region for requesting the user to register a new account. The method 400 then returns at block 433.

Figure 5:
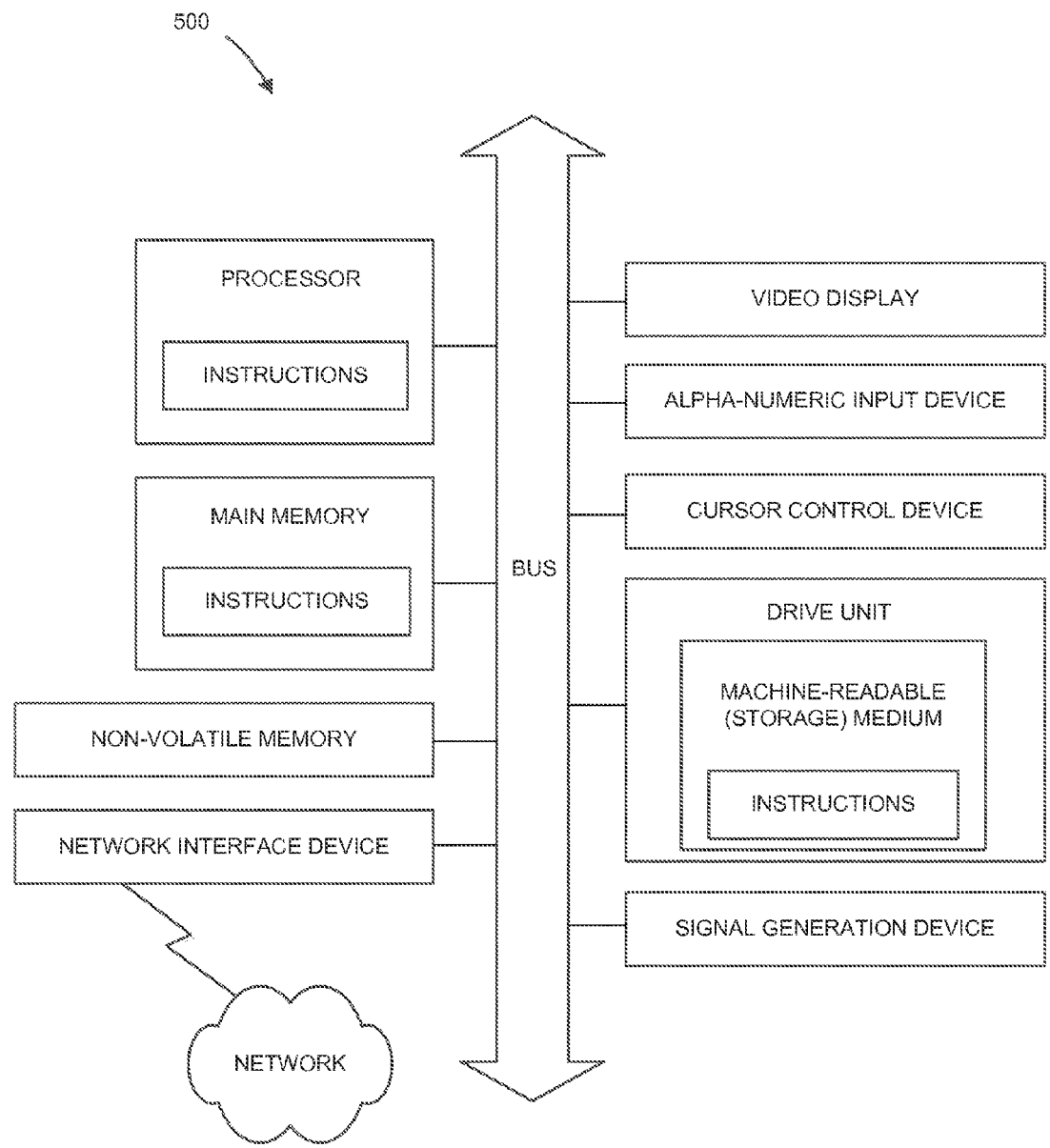
FIG. 5 is a block diagram illustrating a computing system in accordance with embodiments of the disclosed technology.

FIG. 5 is a diagrammatic representation of a machine in the example form of a computer system 500 within which a set of instructions, for causing the machine to perform any one or more of the methodologies or modules discussed herein, may be executed. In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components depicted in the examples of FIGS. 1-4 (and any other components described in this specification) can be implemented. The computer system 500 can be of any applicable known or convenient type. The components of the computer system 500 can be coupled together via a bus or through some other known or convenient device.

The computer system 500 can take any suitable physical form. As example and not by way of limitation, the computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems 500 may be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Core microprocessor or an Intel Itanium microprocessor or a Motorola PowerPC microprocessor or a SPARC (scalable processor architecture) processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, a random access memory (RAM), such as a dynamic RAM (DRAM) or a static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, an erasable programmable read-only memory such as EPROM or EEPROM, a magnetic or optical card, or another form of storage for large amounts of data. Some of this data is often written, by a direct memory access process, into memory during execution of software in the computer system 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 500. The interface can include an analog modem, ISDN (integrated services digital network) modem, cable modem, token ring interface, satellite transmission interface (e.g., "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 5 reside in the interface.

The computer system 500 can have one bus or multiple buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, or USB 3.0), an International Institute of Communication (I2C) bus, an Institute of Electrical and Electronics Engineers (IEEE) standard 1394 bus, also called "Firewire," a QuickPath Interconnect bus, a Thunder-Bolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), a High-Definition Multimedia Interface (HDMI) interconnect bus, and a Digital Visual Interface (DVI) bus.

In operation, the computer system 500 can be controlled by operating system software that includes a file management system, such as a disk operating system. The file management system is typically stored in a non-volatile memory and/or drive unit and causes the processor to execute the various acts required by the operating system to input and output data and to store data in the non-volatile memory and/or drive unit.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

What is claimed is:

1. A system, comprising:
   a server computing device having:
      a processor and memory;
      a first component configured to:
         receive from a client computing device a sequence of characters corresponding to a portion of an email address; and retrieve from a database a set of email addresses that have a common first portion that is identical to the received sequence of characters; and limit the set of retrieved email addresses to a specified maximum number;

a first component configured to, for each retrieved email address in the set of retrieved email addresses:

hash, using a hashing function and a generated salt value, the retrieved email address, wherein the hashing is performed a specified number of times;

generate and hash noise data;

produce hashed data including the hashed email addresses and the hashed noise data; and return, to the client computing device from which the sequence of characters was received, the hashed data, the hashed generated salt value, and a complexity value, the complexity value indicative of the specified number of times the hashing was performed; and the client computing device having:

a processor and memory;

a first component configured to initially display in a user interface a first text region to collect from a user an email address, without displaying in the user interface a second text region to collect from the user a password;

a first component configured to:

monitor an initial sequence of characters received in the first text region for collecting the email address;

detect that a specified character is received in the first text region;

transmit, in response to the detected specified character, the sequence of characters to the server computing device;

receive from the server computing device the hashed data, the hashed salt value, and the complexity value;

monitor an additional sequence of characters received in the first text region for collecting the email address, the additional sequence of characters entered after the detected specified character;

hash, using the hashing function and the salt value, the initial sequence of characters, the specified character, and the additional sequence of characters, the hashing performed the specified number of times corresponding to the received complexity value;

determine whether a result value of the hashing the specified number of times is in the received hashed data; and in an event the result value is in the received hashed data, display the second text region for collecting from the user a password corresponding to the collected email address.

2. The system of claim 1, wherein in an event the result value is not in the received hashed data, a third text region is displayed in the user interface for creating an account.

3. The system of claim 1, wherein the specified maximum number is determined based on empirical data, and wherein limiting the set of retrieved email addresses to the specified maximum number includes updating the set of retrieved email addresses.

4. The system of claim 3, wherein the set of retrieved email addresses is updated by receiving an updated sequence of characters from the client computing device, and wherein the updated sequence of characters includes one or more additional characters input by the user after the specified character is detected.

5. The system of claim 3, wherein the set of retrieved email addresses is updated by receiving an updated sequence of characters from the client computing device, and wherein the updated sequence of characters includes a complete portion of the email address input by the user.

6. The system of claim 1, wherein the complexity value increases in response to an identified user conduct, and wherein the complexity value is indicative of an amount of computing performed in the client computing device.

7. The system of claim 6, wherein the identified user conduct relates to an attempt to collect account information.

8. A system for limiting account enumeration, comprising:

a processor;

a memory coupled to the processor;

a display configured to provide a user interface displaying a first text region to collect a sequence of characters corresponding to a user identifier;

an input component configured to enable a user to input the sequence of characters in a first text region;

a monitoring component configured to monitor an initial sequence of characters and an additional sequence of characters received in the first text region;

a detecting device configured to detect a specified character received in the first text region, wherein the additional sequence of characters is entered after the detected specified character;

a transmitting component configured to transmit, in response to the detected specified character, the sequence of characters to a server computing device;

a receiving component configured to receive, from the server computing device, hashed data and a complexity value, wherein the received hashed data is indicative of a hashing function and a generated salt value;

a hashing component configured to hash, using the hashing function and the generated salt value, the initial sequence of characters, the specified character, and the additional sequence of characters to generate a result value, the hashing performed the specified number of times corresponding to the received complexity value; and wherein in an event the result value is in the received hashed data, a second text region is displayed in the user interface for collecting a password corresponding to the user identifier.

9. The system of claim 8, wherein the hashed data includes hashed noise data that is hashed from generated noise data.

10. The system of claim 9, wherein the complexity value increases in response to an identified user conduct, and wherein an amount of the generated noise data increases in response to the increase of the complexity value.

11. The system of claim 8, wherein the generated salt value includes a public salt value.

12. The system of claim 8, wherein the server computing device retrieves from a database a set of user identifiers that have a common first portion that is identical to the transmitted sequence of characters, and wherein the hashed data is produced by hashing the set of retrieved user identifiers and the generated salt value by performing the hashing function for a specified number of times, and wherein the hashed data includes hashed user identifiers and hashed generated salt value, and wherein the complexity value is indicative of the specified number of times the hashing was performed, and wherein the number of the set of user identifiers is limited to a specified maximum number.

13. The system of claim 12, wherein the specified maximum number is determined based on empirical data, and wherein the set of retrieved user identifiers is limited to the specified maximum number by updating the set of retrieved user identifiers.

14. The system of claim 13, wherein the set of retrieved user identifiers is updated by receiving an updated sequence of characters from the system, and wherein the updated sequence of characters includes one or more additional characters input by the user after the specified character is detected.

15. The system of claim 13, wherein the set of retrieved user identifiers is updated by receiving an updated sequence of characters from the system, and wherein the updated sequence of characters includes a complete portion of the user identifier input by the user.

16. The system of claim 8, wherein the user identifier includes an email address, and wherein the specified character includes an ampersat.

17. The system of claim 8, wherein the specified character includes a string.

18. The system of claim 8, wherein in an event the result value is not in the received hashed data, a third text region is displayed in the user interface for registering an account.

19. A method of dynamically verifying existing user accounts, comprising:
   monitoring an initial sequence of characters input by a user in a first text region in a user interface, wherein the initial sequence of characters corresponds to a user identifier;
   detecting a specified character received in the first text region;
   transmitting, in response to the detected specified character, a sequence of characters to a server computing device;
   receiving hashed data and a complexity value from the server computing device, wherein the hashed data is indicative of a hashing function;
   monitoring an additional sequence of characters received in the first text region, wherein the additional sequence of characters is entered after the detected specified character;
   hashing, using the hashing function, the initial sequence of characters, the specified character, and the additional sequence of characters to generate a result value, wherein the hashing is performed the specified number of times corresponding to the received complexity value; and
   in an event the result value is in the received hashed data, displaying a second text region for collecting from the user a password corresponding to the user identifier.

20. The method of claim 19, wherein in an event the result value is not in the received hashed data, a third text region is displayed in the user interface to request the user to register an account.

21. The method of claim 19, further comprising increasing the complexity value in response to an identified user conduct, wherein the complexity value is indicative of an amount of computing consumed by performing the method.

22. The method of claim 19, wherein the hashed data includes hashed noise data that is hashed from generated noise data.

23. The method of claim 22, wherein the hashed noise data is increased in response to the increase of the complexity value.

24. The method of claim 19, wherein the server computing device retrieves from a database a set of user identifiers that have a common first portion that is identical to the transmitted sequence of characters, and wherein the hashed data is produced by hashing the set of retrieved user identifiers by performing the hashing function for a specified number of times, and wherein the hashed data includes hashed user identifiers, and wherein the complexity value is indicative of the specified number of times the hashing was performed and wherein the number of the set of retrieved user identifiers is limited to a specified maximum number determined based on empirical data.

25. The method of claim 24, wherein the set of retrieved user identifiers is limited to the specified maximum number by updating the set of retrieved user identifiers, and wherein the set of retrieved user identifiers is updated by receiving an updated sequence of characters from the client computing device, and wherein the updated sequence of characters includes one or more additional characters input by the user after the specified character is detected.

26. The method of claim 24, wherein the set of retrieved user identifiers is limited to the specified maximum number by updating the set of retrieved user identifiers, and wherein the set of retrieved user identifiers is updated by receiving an updated sequence of characters from the client computing device, and wherein the updated sequence of characters includes a complete portion of the user identifier input by the user.

27. A method of locally verifying existing user accounts, the method comprising:
   displaying a first text region in a user interface to collect from an user an user identifier;
   monitoring an initial sequence of characters received in the first text region;
   detecting a specified character received in the first text region;
   transmitting, in response to the detected specified character, a sequence of characters to a server computing device;
   receiving hashed data and a complexity value from the server computing device, wherein the hashed data is generated by hashing, using a hashing function and a salt value, a set of user identifiers retrieved from a database;
   monitoring an additional sequence of characters received in the first text region, the additional sequence of characters being entered after the detected specified character;
   hashing, using the hashing function and the salt value, the initial sequence of characters, the specified character, and the additional sequence of characters to generate a result value, the hashing performed the specified number of times corresponding to the received complexity value; and
   in an event the result value is in the received hashed data, displaying a second text region for collecting from the user a password corresponding to the collected user identifier.

28. The method of claim 27, wherein in an event the result value is not in the received hashed data, a third text region is displayed in the user interface for creating an account.

29. The method of claim 27, wherein the complexity value increases in response to an identified user conduct, wherein the complexity value is indicative of an amount of computing performed locally.

30. The method of claim 27, wherein the hashed data includes hashed noise data, and wherein the hashed noise data is hashed, by the hashing function and the salt value, from generated noise data.

* * * * *